United States Patent
Gullotta

(10) Patent No.: US 9,550,251 B2
(45) Date of Patent: Jan. 24, 2017

(54) POWER SUPPLY ASSEMBLY FOR A PLASMA ARC TORCH SYSTEM

(71) Applicant: Hypertherm, Inc., Hanover, NH (US)

(72) Inventor: Justin Gullotta, Brownsville, VT (US)

(73) Assignee: Hypertherm, Inc., Hanover, NH (US)

( * ) Notice: Subject to any disclaimer, the term of this patent is extended or adjusted under 35 U.S.C. 154(b) by 289 days.

(21) Appl. No.: 14/228,592

(22) Filed: Mar. 28, 2014

(65) Prior Publication Data

US 2015/0273617 A1    Oct. 1, 2015

(51) Int. Cl.
  *B23K 10/00*    (2006.01)
  *H05H 1/36*    (2006.01)

(52) U.S. Cl.
  CPC .............. *B23K 10/006* (2013.01); *H05H 1/36* (2013.01)

(58) Field of Classification Search
  CPC .............. H05H 1/36; H05H 1/26; H05H 1/34; B23K 10/006
  USPC .......................... 219/121.54, 121.57, 121.48
  See application file for complete search history.

(56) References Cited

U.S. PATENT DOCUMENTS

| | | |
|---|---|---|
| 3,309,497 A | 3/1967 | Kensrue |
| 4,182,949 A | 1/1980 | Powers et al. |
| 4,370,539 A | 1/1983 | Garlanov |
| 4,525,621 A | 6/1985 | Puschner |
| 4,791,268 A | 12/1988 | Sanders et al. |
| 5,070,227 A | 12/1991 | Luo et al. |
| 5,086,205 A * | 2/1992 | Thommes ............ B23K 10/00 219/121.39 |
| 5,225,657 A | 7/1993 | Blankenship |
| 5,225,658 A | 7/1993 | Yamaguchi et al. |
| 5,250,786 A | 10/1993 | Kikuchi et al. |
| 5,416,297 A | 5/1995 | Luo et al. |
| 5,472,024 A | 12/1995 | Brugerolle et al. |
| 5,660,745 A | 8/1997 | Naor |
| 5,828,030 A | 10/1998 | Naor |
| 5,886,315 A | 3/1999 | Lu et al. |

(Continued)

FOREIGN PATENT DOCUMENTS

| | | |
|---|---|---|
| CA | 1090428 | 11/1980 |
| CN | 86210798 | 10/1987 |

(Continued)

OTHER PUBLICATIONS

Trek 180, Battery-Powered MIG Welding Package, Hobart Welders, Sep. 2009, 1 page.

(Continued)

*Primary Examiner* — Mark Paschall
(74) *Attorney, Agent, or Firm* — Proskauer Rose LLP

(57) ABSTRACT

A power supply assembly for a plasma arc torch is provided. The power supply assembly includes an input circuit, an energy storage device, a torch connector and an output circuit. The input circuit is configured to produce a first output signal. The energy storage device is electrically connected to the input circuit for receiving a charge signal therefrom. The energy storage device is capable of producing a second output signal. The torch connector is electrically connected to the input circuit and the energy storage device for receiving the first and second output signals through the output circuit. The torch connector is configured to supply at least one of the first or second output signal to the plasma arc torch to sustain a plasma arc.

22 Claims, 4 Drawing Sheets

(56) References Cited

U.S. PATENT DOCUMENTS

| | | | |
|---|---|---|---|
| 5,900,169 A | 5/1999 | Borowy et al. | |
| 5,961,855 A | 10/1999 | Hewett et al. | |
| 6,051,809 A | 4/2000 | Colella | |
| 6,054,670 A | 4/2000 | Naor | |
| 6,111,215 A | 8/2000 | Lilly | |
| 6,194,682 B1 | 2/2001 | Schneider et al. | |
| 6,225,596 B1 | 5/2001 | Chandler et al. | |
| 6,242,710 B1 | 6/2001 | Naor | |
| 6,331,694 B1 | 12/2001 | Blankenship | |
| 6,350,960 B1 | 2/2002 | Norris | |
| 6,365,868 B1 * | 4/2002 | Borowy | B23K 10/006 219/121.54 |
| 6,406,759 B1 | 6/2002 | Roth | |
| 6,444,944 B2 | 9/2002 | Schneider et al. | |
| 6,476,354 B1 | 11/2002 | Jank et al. | |
| 6,479,795 B1 | 11/2002 | Albrecht et al. | |
| 6,486,430 B2 | 11/2002 | Naor | |
| 6,512,201 B2 | 1/2003 | Blankenship | |
| 6,552,303 B1 | 4/2003 | Blankenship et al. | |
| 6,703,581 B2 | 3/2004 | Jones et al. | |
| 6,747,246 B2 | 6/2004 | Crandell, III | |
| 6,777,649 B2 * | 8/2004 | Reynolds | B23K 9/1081 219/130.1 |
| 6,815,632 B2 | 11/2004 | Dallavalle | |
| 6,818,860 B1 | 11/2004 | Stava et al. | |
| 6,881,921 B2 | 4/2005 | Horner-Richardson et al. | |
| 6,903,301 B2 | 6/2005 | Jones et al. | |
| 6,977,358 B2 | 12/2005 | Albrecht et al. | |
| 6,982,398 B2 | 1/2006 | Albrecht | |
| 7,183,517 B2 * | 2/2007 | Albrecht | B23K 9/1056 219/130.4 |
| 7,188,645 B2 | 3/2007 | Bender et al. | |
| 7,355,141 B2 | 4/2008 | Albrecht et al. | |
| 7,423,238 B2 | 9/2008 | Stanzel et al. | |
| 7,615,719 B2 | 11/2009 | Shipulski | |
| 7,615,720 B2 | 11/2009 | Sanders | |
| 8,203,096 B2 | 6/2012 | Saunders et al. | |
| 8,344,675 B2 | 1/2013 | Miwa et al. | |
| 8,350,182 B2 | 1/2013 | Shipulski | |
| 8,373,084 B2 | 2/2013 | Salsich | |
| 8,405,001 B2 * | 3/2013 | Albrecht | B23K 9/1006 219/108 |
| 8,569,652 B2 * | 10/2013 | Albrecht | B23K 9/1006 219/130.1 |
| 8,791,388 B2 * | 7/2014 | Albrecht | B23K 9/1006 219/133 |
| 8,890,021 B2 | 11/2014 | Shipulski | |
| 2001/0037996 A1 | 11/2001 | Naor | |
| 2001/0042736 A1 | 11/2001 | Schneider et al. | |
| 2002/0023908 A1 | 2/2002 | Blankenship | |
| 2002/0117483 A1 | 8/2002 | Jones et al. | |
| 2002/0117484 A1 | 8/2002 | Jones et al. | |
| 2002/0187066 A1 | 12/2002 | Yu et al. | |
| 2004/0069752 A1 | 4/2004 | Ulrich et al. | |
| 2004/0149702 A1 | 8/2004 | Dallavalle | |
| 2004/0232118 A1 | 11/2004 | Horner-Richardson et al. | |
| 2005/0000946 A1 | 1/2005 | Albrecht et al. | |
| 2005/0073282 A1 | 4/2005 | Carrier et al. | |
| 2005/0077878 A1 | 4/2005 | Carrier et al. | |
| 2005/0109748 A1 | 5/2005 | Albrecht et al. | |
| 2005/0111995 A1 | 5/2005 | Everson | |
| 2005/0252889 A1 | 11/2005 | Stanzel et al. | |
| 2005/0252890 A1 | 11/2005 | Stanzel et al. | |
| 2005/0252899 A1 | 11/2005 | Stanzel et al. | |
| 2005/0263514 A1 | 12/2005 | Albrecht | |
| 2006/0124638 A1 | 6/2006 | Jensen | |
| 2006/0138113 A1 | 6/2006 | Ott | |
| 2007/0181547 A1 * | 8/2007 | Vogel | B23K 9/1081 219/130.1 |
| 2007/0187376 A1 | 8/2007 | Albrecht et al. | |
| 2007/0193762 A1 | 8/2007 | Arimura et al. | |
| 2007/0221628 A1 | 9/2007 | Stanzel et al. | |
| 2007/0257084 A1 | 11/2007 | Carrier et al. | |
| 2008/0029153 A1 | 2/2008 | Margalit | |
| 2008/0210676 A1 | 9/2008 | Lambirth et al. | |
| 2009/0008374 A1 | 1/2009 | Fosbinder | |
| 2009/0057285 A1 | 3/2009 | Bashore | |
| 2010/0051595 A1 | 3/2010 | Diedrick et al. | |
| 2010/0117581 A1 | 5/2010 | Miwa et al. | |
| 2010/0314375 A1 | 12/2010 | Kaufman | |
| 2012/0006792 A1 | 1/2012 | Rozmarynowski et al. | |
| 2016/0184917 A1 | 6/2016 | Albrecht | |

FOREIGN PATENT DOCUMENTS

| | | |
|---|---|---|
| CN | 2682717 | 3/2005 |
| DK | 8308999.3 | 11/1983 |
| EP | 1500456 | 1/2005 |
| EP | 1535691 | 6/2005 |
| EP | 1596123 | 11/2005 |
| EP | 1679666 | 12/2005 |
| EP | 1629926 | 3/2006 |
| EP | 1852206 | 11/2007 |
| GB | 1453100 | 10/1976 |
| GB | 2316244 | 2/1998 |
| JP | 56077068 | 6/1981 |
| JP | 1245972 | 10/1989 |
| WO | 00/76709 | 12/2000 |
| WO | 2005/026650 | 3/2005 |
| WO | 2009/085370 | 7/2009 |

OTHER PUBLICATIONS

International Search Report and Written Opinion for PCT/US2007/078044, dated Dec. 3, 2007, 13 pages.

International Search Report for PCT/US2008/075788, dated Jun. 8, 2009, 7 pages.

* cited by examiner

POWER SUPPLY ASSEMBLY FOR A PLASMA ARC TORCH SYSTEM

TECHNICAL FIELD

This disclosure relates generally to a power supply assembly for sustaining a plasma arc in a plasma arc torch, and more particularly, to a power supply assembly incorporating an energy storage device.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the torch body. In operation, a plasma arc torch produces a plasma arc, which is a constricted jet of an ionized gas with high temperature and sufficient momentum to assist with removal of molten metal.

A plasma arc torch can be powered by a removable energy storage device, such as a battery pack, to enable cordless torch operation. For example, U.S. Pat. No. 7,183,517, hereinafter referred to as the '517 patent, discloses a portable welding-type apparatus with a removable energy storage device. An external power source provides power to a charger, which may be used to charge the energy storage device. The voltage output of the energy storage device is provided to a boost circuit configured to boost the voltage output of the energy storage device to a second voltage to power the welding-type apparatus according to a selected welding-type process. In the '517 patent, because the energy storage device is located between the external power source and the boost circuit, a different charger for charging the energy storage device is needed each time the external power source provides a different input voltage. Alternatively, restrictions can be placed on the amount of input voltage supplied by the external power source of the '517 patent, but at the expense of limiting the usage of the battery-powered apparatus. Moreover, in the '571 patent, extra external hardware is needed to charge the energy storage device. Because this hardware is external to the plasma power supply, it is less integrated in comparison to a system that can use the existing control hardware and/or software to regulate the charge of the energy storage device. In addition, the power generated by the energy storage device of the '571 patent needs to pass through additional circuit components (e.g., a boost circuit) prior to reaching the torch, which creates inefficiency and energy loss.

SUMMARY

Therefore, a power supply assembly, including a removable and/or rechargeable energy storage device, is needed to power a plasma arc torch that can accept a wide range of input power from an external power source without additional hardware requirement. For example, the energy storage device can be located at a position in the power supply assembly that increases efficiency and controllability while enhancing integration. In addition, a power supply assembly is needed that can support plasma arc torch operations by supplying power from one of several sources, including an external power source, an energy storage device, or a combination thereof, and automatically transition from one type of power source to another as operating conditions change.

In some aspects, a power supply assembly for a plasma arc torch is provided. The power supply assembly includes an input circuit, an energy storage device, and a torch connector. The in input circuit is configured to produce a first output signal. The input circuit includes at least one of a boost circuit or a rectification circuit. The energy storage device is electrically connected to the input circuit for receiving a charge signal therefrom. The energy storage device capable of producing a second output signal. The torch connector is electrically connected to the input circuit and the energy storage device for receiving the first and second output signals. The torch connector is configured to supply at least one of the first or second output signal to the plasma arc torch to sustain a plasma arc.

In some embodiments, the power supply assembly further includes an inverter circuit configured to convert the at least one of the first or second output signal from a direct current (DC) format to an alternating current (AC) format prior to delivering the signal to the plasma arc torch. The power supply assembly can also include power management circuitry disposed in the input circuit to manage transfer of energy from the input circuit to the energy storage device via the charge signal.

In another aspect, a method for operating a power supply assembly is provided for supplying power to a plasma arc torch system. The method includes directing an input signal to an input circuit to produce a first output signal. The input circuit is configured to perform at least one of boosting a voltage of the input signal or rectifying a current of the input signal. The method includes receiving, by an energy storage device electrically connected to the input circuit, a charge signal from the input circuit and generating, by the energy storage device, based on the charge signal a second output signal configured to supplement the first output signal. The method further includes delivering directly, by a torch connector, at least one the first output signal or the second output signal to the plasma arc torch system to sustain a plasma arc. The method can further include converting, by an inverter circuit, the format of at least one of the first or second output signal prior to that signal being delivered to the plasma arc torch. The inverter circuit can be connected between the torch connector and at least one of the input circuit or the energy storage device.

In some embodiments, the method further includes sustaining the plasma arc by energy substantially or entirely from the second output signal of the energy storage device. In some embodiments, the method further includes sustaining the plasma arc by energy from both the input circuit and the energy storage device. In some embodiments, the method further includes sustaining the plasma arc by energy substantially from the first output signal of the input circuit.

In some embodiments, the method further includes monitoring a parameter associated with the plasma arc torch system and determining, based on the monitoring, an amount of power for delivery by the second output signal of the energy storage device to supplement the power of the first output signal. In addition, the amount of power delivered by the second output signal can be increased in response to a decrease or disappearance in the power of the first output signal.

In some embodiments, the method further includes modifying, by an inverter circuit, the at least one first or second output signal from a DC waveform to an AC waveform. The inverter circuit can be electrically connected to the energy storage device and the input circuit. The inverter circuit can supply the modified first or second output signal to the plasma arc torch system via the torch connector.

In some embodiments, the method further includes operating the plasma arc torch system to perform a cutting operation using the energy from both the input circuit and the energy storage device. Subsequently, the cutting operation can transition to substantially rely on the energy from the second output signal of the energy storage device.

Embodiments can include one or more of the following features. In some embodiments, the plasma arc torch comprises an air-cooled plasma arc torch. The boost circuit can be a boost circuit for the plasma arc torch. The rectification circuit can be a rectification circuit for the plasma arc torch. At least one of the boost circuit or the rectification circuit is configured to supply power to the plasma arc torch system.

In some embodiments, the plasma arc torch is operated using power supplied, at least in part, from the energy storage device. In some embodiments, the plasma arc torch is operated using power supplied substantially from the input circuit.

In some embodiments, the nominal voltage of the at least one the first output signal or the second output signal remains constant regardless of the voltage of the input signal.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

In some aspects, a power supply assembly for operating a plasma arc torch is described, where the power supply assembly includes a removable and/or rechargeable energy storage device, such as a battery. As one skilled in the art will fully appreciate, the description below with respect to plasma arc torches is also applicable to other cutting systems that require high power outputs, such as welders and the like.

In addition, aspects of the technology are applicable to a wide variety of cordless power driven tools.

Figure 1:
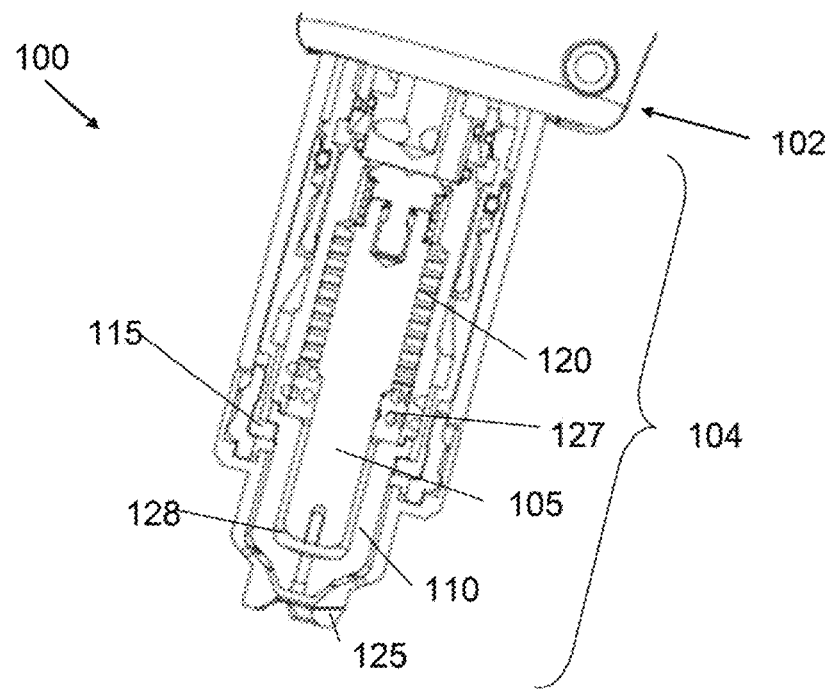
FIG. 1 is a cross-sectional view of an exemplary plasma arc torch.

FIG. 1 is a cross-sectional view of an exemplary plasma arc torch 100 including a torch body 102 and a torch tip 104. The torch tip 104 includes multiple consumables, for example, an electrode 105, a nozzle 110, a retaining cap 115, a swirl ring 120, and a shield 125. The torch body 102, which has a generally cylindrical shape, supports the electrode 105 and the nozzle 110. The nozzle 110 is spaced from the electrode 105 and has a central exit orifice mounted within the torch body 102. The swirl ring 120 is mounted to the torch body 102 and has a set of radially offset or canted gas distribution holes 127 that impart a tangential velocity component to the plasma gas flow, causing the plasma gas flow to swirl. The shield 125, which also includes an exit orifice, is connected (e.g., threaded) to the retaining cap 115. The retaining cap 115 as shown is an inner retaining cap securely connected (e.g., threaded) to the nozzle 110. In some embodiments, an outer retaining cap (not shown) is secured relative to the shield 125. The torch 100 can additionally include electrical connections, passages for cooling, passages for arc control fluids (e.g., plasma gas), and a power supply. In some embodiments, the consumables include a welding tip, which is a nozzle for passing an ignited welding gas.

In operation, plasma gas flows through a gas inlet tube (not shown) and the gas distribution holes 127 in the swirl ring 120. From there, the plasma gas flows into a plasma chamber 128 and out of the torch 100 through the exit orifice of the nozzle 110 and the shield 125. A pilot arc is first generated between the electrode 105 and the nozzle 110. The pilot arc ionizes the gas passing through the nozzle exit orifice and the shield exit orifice. The arc then transfers from the nozzle 110 to a workpiece (not shown) for thermally processing (e.g., cutting or welding) the workpiece. It is noted that the illustrated details of the torch 100, including the arrangement of the components, the direction of gas and cooling fluid flows, and the electrical connections, can take a variety of forms. In some embodiments, the plasma arc torch 100 is air cooled. Air-cooled torches can be simpler to use and better suited for certain applications, such as low-amp plasma cutting applications, in comparison to water-cooled torches.

Figure 2:
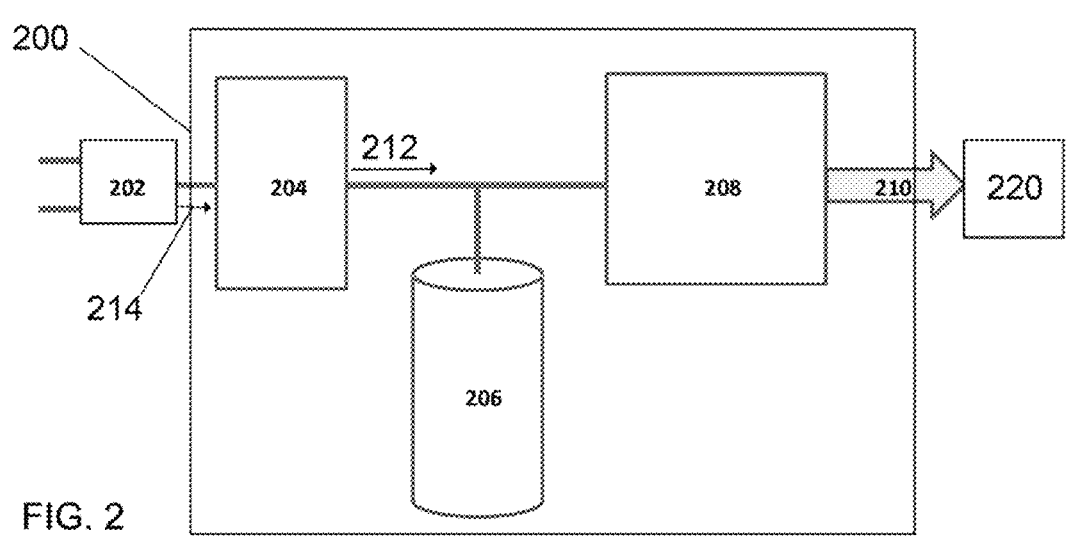
FIG. 2 shows an exemplary power supply assembly configured to provide energy to a plasma arc torch.

FIG. 2 shows an exemplary power supply assembly 200 configured to provide energy to a plasma arc torch 220, such as the plasma arc torch 100 of FIG. 1, to sustain a plasma arc during a desired torch operation. As shown, the power supply assembly 200 includes an input circuit 204, an energy storage device 206, an output circuit 208, and a torch connector 210. The input circuit 204 of the power supply assembly 200 is connected to an external power source 202 that can provide an alternate-current (AC) input signal 214 to the input circuit 204. The energy storage device 206 can be connected between an output of the input circuit 204 and an input of the output circuit 208. The torch connector 210 can be located between an output of the output circuit 208 and the plasma arc torch 220. In the absence of the output circuit 208, the input circuit 204 and the energy storage device 206 can be electrically connected directly to the torch connector 210.

The input circuit 204 can include at least one of a rectification circuit (not shown) or a boost circuit (not shown). The rectification circuit can rectify the input signal 214 received from the external power source 202. The boost circuit can be a power factor corrected (PFC) boost converter that converts the rectified signal from the rectification circuit or the input signal 214 from the external power source 202 to a constant, predefined direct-current (DC) output signal 212. While the voltage of the input signal 214 can vary based on the magnitude of the external power supply 202, the voltage of the output signal 212 can be maintained by the input circuit 204 to be substantially constant, such as within about 20% deviation from a nominal voltage ($V_{bus\_nominal}$) that is optimal for operating the plasma arc torch 220. For example, the external power source 202 can be a wall power that generates an AC input signal 214 ranging between 100 to 240 V at 50 or 60 Hz, while the voltage of the output signal 212 can be maintained close to the $V_{bus\_nominal}$ of 375V.

The output circuit 208 and the torch connector 210 of the power supply assembly 200 can provide the output signal 212 from the input circuit 204 to the plasma arc torch 220. The torch connector 210 can be a transmission medium that includes an electrical transmission capability and is connected to the plasma arc torch 220. The electrical transmission capability can include an electrical lead set, a bus, and/or a wired connection. The output circuit 208 can include an inverter circuit configured to modify a signal, such as from a DC waveform to an AC waveform, prior to providing the resulting modified signal to the torch connector 210.

The energy storage device 206 of the power supply assembly 200 can comprise one or more removable and/or rechargeable battery cells that have a combined nominal DC voltage about the same as the nominal voltage of the output signal 212 (i.e., $V_{bus\_nominal}$). In one example, to achieve a nominal voltage of about 370V, the energy storage device 206 can include 100 lithium polymer battery cells, where each cell has a nominal voltage of 3.7V. In some embodiments, each battery cell weighs about 28 grams, with the entire battery pack weighing about 2.8 kg. For this 100-cell battery pack, the cycle life is about 200 to 400 cycles, the capacity is about 1000 m amp-hour (A-hr) or 370 W-hr, and the volume is about 1561 cm$^3$ (each cell is about 15.61 cm$^3$). In another example, to achieve a nominal output voltage of about 370V, the energy storage device 206 can include 31 lead-acid battery cells, where each cell has a nominal voltage of 12 V. In some embodiments, each battery cell weighs about 920 grams, with the entire battery pack weighing about 28.52 kg. For this 31-cell battery pack, the cycle life is about 250-400 cycles, the capacity is about 2000 mA-hr or 620 W-hr, and the volume is about 6913 cm$^3$ (each cell is about 223 cm$^3$).

Figure 3:
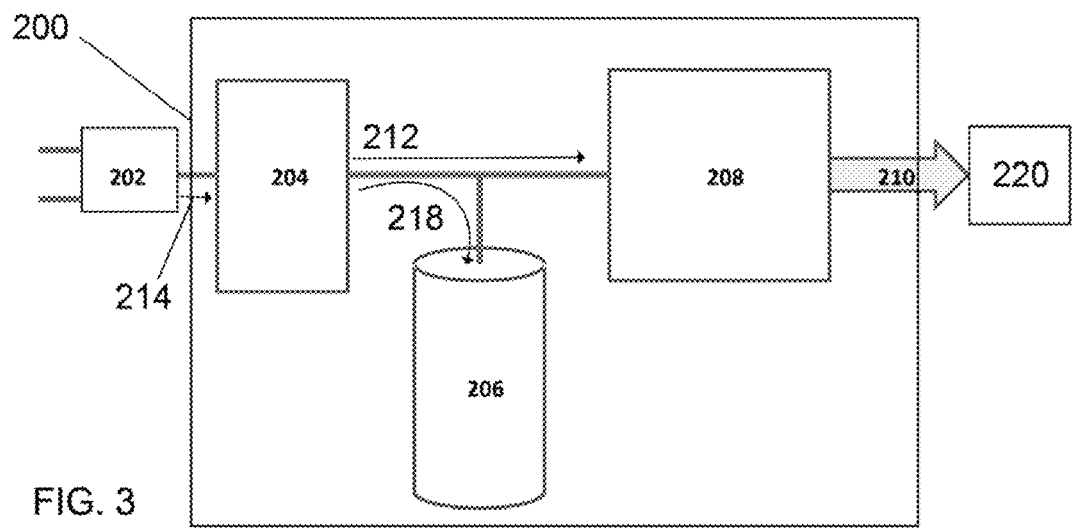
FIG. 3 shows an exemplary mode for operating the power supply assembly of FIG. 2.

In various modes of operation, the power supply assembly 200 can supply power to the plasma arc torch 220 using (1) power substantially from the input circuit 204 via the output signal 212, (2) power substantially from the energy storage device 206 via the output signal 216, or (3) power from the input circuit 204 and the energy storage device 206 via a combination of the output signals 212 and 216. FIG. 3 shows an exemplary mode of operating the power supply assembly 200 of FIG. 2. In this mode, the input circuit 204 supplies the output signal 212 to the plasma arc torch 220 via the torch connector 210, where the output signal 212 constitutes the main source of power for the plasma arc torch 220. The input circuit 204 also generates a charge signal 218 to charge the energy storage device 206, if the voltage of the output signal 212 (about 20% deviation from the $V_{bus\_nominal}$) is greater than or substantially equal to the voltage of the energy storage device 206. When the energy storage device 206 becomes fully charged and/or when the voltage of the energy storage device 206 is above the voltage of the output signal 212, the input circuit 204 can automatically terminate the supply of the charge signal 218 to the energy storage device 206 by manipulating the output voltage of the input circuit 204. In some embodiments, the input circuit 204 includes power management circuitry configured to intelligently manage and control the transfer of energy from the input circuit 204 to the energy storage device 206 via the charge signal 218. The power management circuitry can include sensing circuits and at least one microprocessor controller configured to detect conditions of the energy storage device 206 and respond accordingly by modifying the charging actions. For example, the power management circuitry can monitor the voltage, current, temperature and/or charging time associated with the energy storage device 206 or the voltage of the output signal 212 and adjust the charging current supplied by the charge signal 218 to provide an optimal charge current. The power management circuitry can stop charging the energy storage device 206 at the end of charge to protect the energy storage device 206 from overcharge. A controller (not shown) can cause the input circuit 204 to stop charging the energy storage device 206 when the voltage of the energy storage device 206 is greater than the voltage of the output signal 212 by, for example, lowering the voltage of the output signal 212 to less than (or equal to) the voltage of the energy storage device 206. In some embodiments, the power management circuitry can be programmed with complex charging cycles matching the specifications of the energy storage device 206 and include circuitry for automatic capacity testing and analyzing functions. Instead of or in addition to the input circuit 204, the power management circuitry can be integrated with other components of the power supply assembly 200, such as with the energy storage device 206 and/or the output circuit 208. In some embodiments, the power management circuitry is located external to the power supply assembly 200, such as integrated with a computer numerical controller (CNC) configured to control the cutting operations of the plasma arc torch 220.

Figure 4:
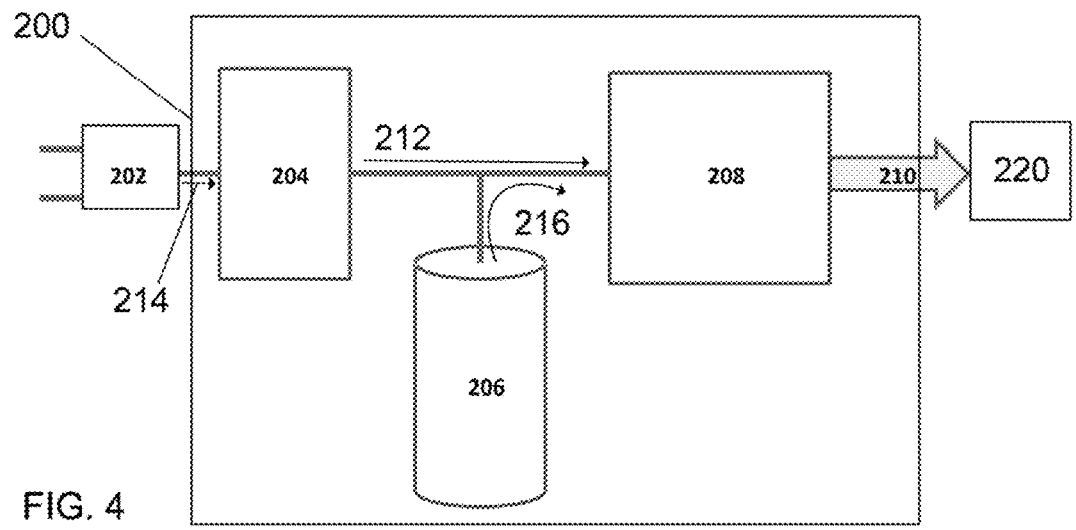
FIG. 4 shows another exemplary mode for operating the power supply assembly of FIG. 2.

FIG. 4 shows another exemplary mode of operating the power supply assembly 200 of FIG. 2. This mode is activated when the voltage of the output signal 212 generated by the input circuit 204 is less than the voltage of the energy storage device 206. In this mode, the power supply assembly 200 switches from the charge mode of FIG. 3 to the discharge mode of FIG. 4, during which the energy storage device 206 can discharge an output signal 216 to the plasma arc torch 220 to at least supplement the energy provided by the output signal 212. The output signal 216 can be supplied to the plasma arc torch 220 via the torch connector 210 and the output circuit 208. In some embodiments, a combination of the output signals 212 and 216 are supplied to the plasma arc torch 220 via the torch connector 210. The two signals can be combined into a single signal prior to transportation by the torch connector 210 (e.g., at the output circuit 208 or before the output circuit 208). Similarly, the inverter of the output circuit 208 can invert the output signals 212 and 216 as individual signals or as a combined signal. Due the use of the PFC converter in the input circuit 204 and the energy storage device 206, the nominal voltages of the output signals 212 and 216 generated by the respective components are constant regardless of the voltage variation of the input signal 214. In some embodiments, the input circuit 204 does not generate an output signal due to, for example, disconnect between the external power source 202 and the input circuit 204. This can occur in the event of a circuit breaker tripping, or if the system is unplugged and intended to run solely from the energy stored in energy storage device 206. In this case, the plasma arc torch 220 is powered solely by the output signal 216 of the energy storage device 206.

In some embodiments, a power adjustment circuit (not shown) is used to monitor at least one parameter associated with the plasma arc torch 220 and determine, based on the monitoring, an amount of additional power that needs to be delivered by the energy storage device 206 via the output signal 216 to augment or replace the power delivered by the input circuit 204 via the output signal 212. For example, if the power delivered by the output signal 212 decreases, the power adjustment circuit can cause the energy storage device 206 to increase the amount of power delivered via the output signal 216. For example, the power adjustment circuit can monitor the required output current and voltage of the torch 220 and, in the event that too much current is needed from the external power source 202 to supply to the torch 220, current is drawn from the energy storage device 206 to augment the power in the signal 212 from the input circuit 204. The power adjustment circuit can cause this to happen by reducing the output voltage of the signal 212 of the input circuit 204. By lowering the voltage of the signal 212 to below the nominal voltage of the energy storage device 206, the energy storage device 206 is adapted to discharge current 216 into the output circuit 208. In addition, the power adjustment circuit can limit the amount of power supplied by the input signal 214 based on a limit set by an operator, for example, and draw the remaining power required to operate the plasma arc torch 220 from the energy storage device 206. Therefore, the power adjustment circuit can automatically and intelligently switch among different modes for supplying power to the plasma arc torch 220 with minimal human intervention. The power adjustment circuit can be integrated with the power management circuit described above, integrated with another system hardware (e.g., a controller of the power supply assembly 200 and the torch 220), or a stand-alone component.

There are several advantages associated with locating the energy storage device 206 at the output of the input circuit 204, such as between the input circuit 204 and the output circuit 208. One advantage is that because the output signal 216 from the energy storage device 206 does not have to pass through the input circuit 204 (in contrast to the case where the energy storage device 206 is connected to the input of the input circuit 204), less energy is used, thereby enhancing overall efficiency. Another advantage is that less hardware is used in comparison to other configurations where the energy storage device 206 is positioned elsewhere in the power supply assembly 200. For example, no extra charger is required to charge the energy storage device 206 since the input circuit 204 can supply the energy storage device 206 its charging power. Similarly, any control used to manage the charging and discharge of the energy storage device 206 can be accomplished by control software/hardware that already exists or by slightly modifying the existing control software/hardware, such as the control software/hardware associated with the input circuit 204. Yet, another advantage offered by the present technology is control integration. Because the management of the output signal 216 of the energy storage device 206 is performed by the same controller that manages one or more operations of the plasma arc torch 220, energy storage device functions can be easily integrated into the normal operation of the torch system.

Figure 5:
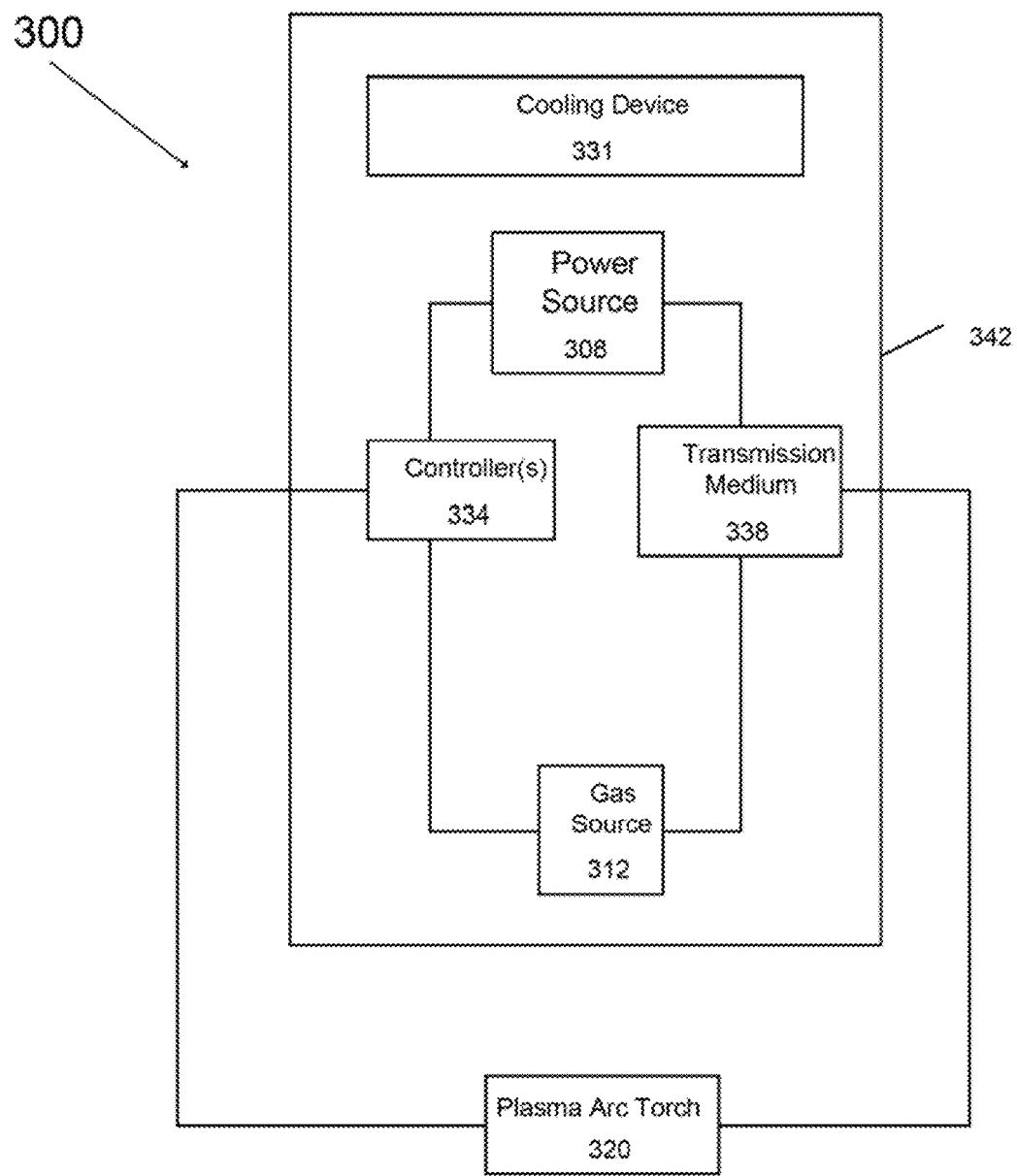
FIG. 5 shows an exemplary autonomous plasma arc torch system.

In some embodiments, the power supply assembly 200 can provide additional energy to power a gas compressor integrated in a plasma arc torch system to support autonomous torch operations. FIG. 5 shows an exemplary autonomous plasma arc torch system. This plasma arc torch system is "autonomous" in that it is a portable system capable of processing materials without large, bulky gas canisters (and, in some embodiments, without a continuous, fixed gas source) and without continuous connection to the electrical power grid by a power cord. In various embodiments, the system is mobile and transportable. In some embodiments, the system can be disposed in a briefcase-sized (and/or hand-held) housing that can be hand-carried or otherwise transported to local and remote locations for use. The system can be a wearable portable assembly in the form of a backpack, front-pack, and/or a shoulder strap mounted pack.

As shown in FIG. 5, the autonomous plasma arc torch system 300 includes a housing 342 enclosing a power source 308, a gas source 312, a transmission unit 338, a controller 334, or any combination thereof. The housing 342 can be a flexible material configured to support the various components disposed on or on the housing 342. In some embodiments, a plasma arc torch 320 and/or a cooling device 331 are also disposed in or on the housing 342. The plasma arc torch 320 can be substantially the same as the torch 100 of FIG. 1. The gas source 312 can be one or more replaceable and/or rechargeable gas containers or a portable compressor. The power source 308 can be substantially the same as the power supply assembly 200 of FIG. 2. The power source 308 can provide (1) sufficient power to the plasma arc torch 320 to sustain a plasma arc and (2) sufficient power to the gas source 612 to enable the gas source 612 to supply gas to the plasma arc torch 620. The transmission medium 338, which can include an electrical transmission capability (similar to the function provided by the torch connector 210 of FIG. 2) and/or a fluid transmission capability (e.g., including a fluid conduit), is connected to the plasma arc torch 320. The controller 334 can include electrical controls and/or fluid controls (e.g., a trigger, relay, solenoid valve, pressure regulator, etc.). In some embodiments, features used in the autonomous plasma arc torch system 300 described herein can be applied to a portable welding apparatus (not shown).

In an exemplary operation involving the plasma arc torch 220 and power supply assembly 200 of FIG. 2, the plasma arc torch 220 is used to perform a cutting operation at 30 A and 125 V, which delivers 3750 W of power. The voltage and current supplied by the energy storage device 206 of the power supply assembly 200 is about 375V and 10 A, respectively, and the capacity of the energy storage device 206 is 1000 mA-hr. The plasma arc torch 220 can draw most of its power from the energy storage device 206, which can deliver 85% of its charge. In another exemplary operation, the plasma arc torch 220 is used to perform a cut operation at 15 A and 83 V, which delivers 1245 W of power. The voltage and current supplied by the energy storage device 206 of the power supply assembly 200 is about 375V and 3.32 A, respectively, and the capacity of the energy storage device 206 is 1000 mA-hr. The plasma arc torch 220 can draw most of its power from the energy storage device 206, which can deliver 85% of its charge.

In an exemplary operation involving the plasma arc torch 320 and power source 308 of FIG. 5, the power supply assembly 308 powers both (1) the gas source 312, which delivers 250 W of power, and (2) the plasma arc torch 320, which is used to perform a cutting operation at 30 A and 125 V, thus delivering 3750 W of power. The voltage and current supplied by the energy storage device of the power supply assembly 308 is about 375V and 10.7 A, respectively, and the capacity of the energy storage device is 1000 mA-hr. The plasma arc torch 320 can draw most of its power from the energy storage device, which can deliver 85% of its charge. In another exemplary operation, the power supply assembly 308 powers both (1) the gas source 312, which delivers 250

W of power, and (2) the plasma arc torch 320, which is used to perform a cutting operation at 15 A and 83 V, thus delivering 1245 W of power. The voltage and current supplied by the energy storage device of the power supply assembly 308 is about 375V and 4 A, respectively, and the capacity of the energy storage device is 1000 mA-hr. The plasma arc torch 320 can draw most of its power from the energy storage device, which can deliver 85% of its charge.

In yet another exemplary torch operation involving the plasma arc torch 220 and power supply assembly 200 of FIG. 2, the plasma arc torch 220 is used to perform a cut operation at 30 A and 125 V, which delivers 3750 W of power. The voltage and current supplied by the energy storage device 206 of the power supply assembly 200 is about 375V and 5.6 A, respectively, and the capacity of the energy storage device 206 is 1000 mA-hr. The plasma arc torch 220 draws its power from a combination of the energy storage device 206, which can deliver 85% of its charge, and a wall power source 202, which provides up to 1650 W of power (i.e., 15 A at 110 V). In another exemplary operation, the plasma arc torch 220 is used to perform a cut operation at 15 A and 83 V, which delivers 1245 W of power. The plasma arc torch 220 draws most of its power from the wall power source 202, which provides up to 1650 W of power (i.e., 15 A at 110 V). No power is drawn from the energy storage device 206.

In yet another exemplary operation involving the plasma arc torch 320 and power source 308 of FIG. 5, the power supply assembly 308 powers both (1) the gas source 312, which delivers 250 W of power, and (2) the plasma arc torch 320, which is used to perform a cutting operation at 30 A and 125 V, thus delivering 3750 W of power. The voltage and current supplied by the energy storage device of the power supply assembly 308 is about 375V and 6.3 A, respectively, and the capacity of the energy storage device is 1000 mA-hr. The plasma arc torch 320 draws its power from a combination of the energy storage device, which delivers 85% of its charge, and a wall power source, which provides up to 1650 W of power (i.e., 15 A at 110 V). In another exemplary operation, the power supply assembly 308 powers both (1) the gas source 312, which delivers 250 W of power, and (2) the plasma arc torch 320, which is used to perform a cutting operation at 15 A and 83 V, thus delivering 1245 W of power. The plasma arc torch 320 draws most of its power from the wall power source, which provides up to 1650 W of power (i.e., 15 A at 110 V). No power is drawn from the energy storage device 206.

Figure 6:
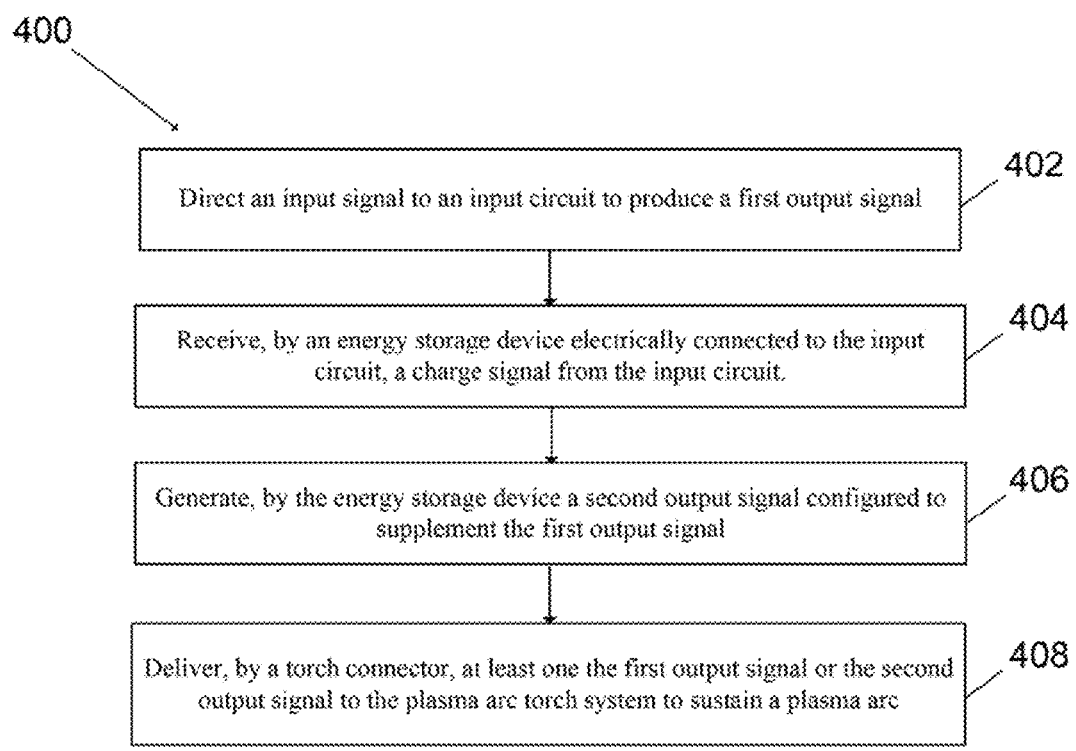
FIG. 6 shows an exemplary process for operating the power supply assembly of FIG. 2.

FIG. 6 shows an exemplary process for operating the power supply assembly 200 of FIG. 2. The process 400 starts at step 402 by directing an input signal (e.g., the input signal 214 produced by the external power source 202) to an input circuit (e.g., the input circuit 204) to produce a first output signal (e.g., the output signal 212). The input circuit 204 includes at least a boost converter. Therefore, the voltage of the output signal 212 can be held relatively constant around a specific nominal voltage ($V_{bus\_nominal}$) while the voltage of the input signal 214 can vary widely. If the input signal 214 is an AC signal, the input circuit 204 can also use a rectifier to rectify the input signal 214.

At step 404, an energy storage device (e.g., the energy storage device 206) electrically connected to the input circuit 204 to receive a charge signal (e.g., the charge signal 218) from the input circuit 204. In some embodiments, the charge signal 218 is only generated if the voltage of the energy storage device 206 is less than the voltage of the first output signal 212. The energy storage device 206 can comprise one or more removable and/or rechargeable battery cells with a combined nominal voltage about the same as $V_{bus\_nominal}$, which is the nominal output voltage of the input circuit 204. Hence, the input circuit 204 can act as a charger for the energy storage device 206. This mode of operation is illustrated by the circuit diagram of FIG. 3.

At step 406, the energy storage device 206 can generate a second output signal (e.g., the output signal 216) configured to supplement the first output signal 212. Due to the use of the energy storage device 206, the nominal voltage of the second output signal 216 also remains constant regardless of the voltage of the input signal 214. In some embodiments, the energy storage device 206 discharges the output signal 216 when the voltage of the energy storage device 206 is greater than the voltage of the first output signal 212. This mode of operation is illustrated by the circuit diagram of FIG. 4. During discharge, the input circuit 204 ceases to supply a charge signal to the energy storage device 206.

At step 408, a torch connector (e.g., the torch connector 210) delivers at least one of the first output signal 212 produced by the input circuit 204 or the second output signal 216 by the energy storage device 206 to the plasma arc torch 202 to sustain a plasma arc for performing a cutting operation. In some embodiments, an inverter in an output circuit (e.g., the output circuit 208) can modify at least one of the first output signal 212 or the second output signal 216, such as converting each signal from a DC waveform to an AC waveform, prior to delivering the signal(s) to the torch connector 210. The output circuit 208 can be electrically connected to the energy storage device 206 and the input circuit 204 at its inputs and the torch connector 210 at its output.

In some embodiments, the plasma arc torch 220 receives substantially all of its operating power from the input circuit 204, such as in the mode of FIG. 3. In some embodiments, the plasma arc torch 220 receives its operating power from the input circuit 204 and/or the energy storage device 206, such as in the mode of FIG. 4. In the case that the external power source 202 is electrically disconnected from the power supply assembly 200, the plasma arc torch 220 can transition from relying on both the input circuit 204 and the energy storage device 206 to receiving most or all of its operating power from the energy storage device 206. In the case that the energy in the energy storage device 206 is becoming depleted (i.e., the voltage of the energy storage device 206 is below the voltage of the first output signal 212), the plasma arc torch 220 can transition from relying on both the input circuit 204 and the energy storage device 206 to receiving operating power from the input circuit 204.

The following examples illustrate one or more advantages of the present technology. In one example, the power supply assembly 200 can regulate the current drawn from the grid power (i.e., via the wall power 202) to satisfy weak circuit breaker limitations, where a circuit breaker is used to detect a fault condition and interrupt current flow. For instance, if a user is attempting to cut with a plasma arc torch that is electrically connected to a 15 A circuit breaker, the user can continuously trip the circuit breaker (i.e., the circuit breaker can cause an open circuit, short circuit or ground fault) since the plasma system can frequently draw large amounts of current while cutting. However, the time-averaged current used by the plasma system is most often less than 15 A. To prevent or reduce unintentional tripping of the circuit breaker, the energy storage device 206 of the power supply assembly 200 can be used to augment the instantaneous power of the plasma process, thereby limiting the current drawn from the grid via the input signal 214 to 15 A or any other value during cutting (i.e., activating the mode of FIG.

4). Additionally, when the user stops cutting, even for a short period of time, the input circuit 204 can charge the energy storage device by drawing power from the grid (i.e., activating the mode of FIG. 3) via the wall power 202, again consuming a maximum of 15 A. Thus, the power supply system 200 can use the energy storage device 206 to realize peak shaving—extend the required energy for the plasma cutting over a longer period of time than the actual cutting duration.

In another example, the power supply assembly 200 can perform breaker trip sensing and adapt accordingly. Because the plasma arc torch system is at least partially powered by the energy storage device 206, if the plasma arc torch trips the attached circuit breaker during torch operation, the plasma arc torch can still continue operation. The power supply system 200 is able to automatically sense the breaker trip, such as when the input signal 212 from the input circuit 204 is zero, and continue to run on power supplied by the energy storage device 206 by activating the mode of FIG. 4. Since the plasma arc torch system continues to operate, an operator or the power supply system 200 can decide to reduce the amount of current drawn from the grid to lessen the chance of future breaker trips. Furthermore, the energy storage device 206 of the power supply assembly 200 can enable battery-only cutting operation in the event that the wall power 202 is disconnected, the circuit breaker trips, there is a loss of grid power, a generator failure, etc.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification. The present application includes such modifications and is limited only by the scope of the claims.

What is claimed is:

1. A power supply assembly for a plasma arc torch, the power supply assembly comprising:
   an input circuit configured to produce a first output signal, the input circuit including at least one of a boost circuit or a rectification circuit;
   an energy storage device electrically connected to an output of the input circuit for receiving a charge signal from the input circuit, the energy storage device configured to produce a second output signal; and
   a torch connector electrically connected to the input circuit and the energy storage device for receiving the first and second output signals, wherein the torch connector is configured to supply the first output signal, the second output signal, or a combination of the first and second output signals to the plasma arc torch to sustain a plasma arc based on comparing a parameter of the plasma arc torch with at least one of the first or second output signal.

2. The power supply assembly of claim 1, further comprising an inverter circuit configured to convert the at least one of the first or second output signal from a direct current (DC) format to an alternating current (AC) format prior to delivering the signal to the plasma arc torch.

3. The power supply assembly of claim 1, wherein the plasma arc torch comprises an air-cooled plasma arc torch.

4. The power supply assembly of claim 1, wherein the boost circuit is a boost circuit for the plasma arc torch.

5. The power supply assembly of claim 1, wherein the rectification circuit is a rectification circuit for the plasma arc torch.

6. The power supply assembly of claim 1, wherein at least one of the boost circuit or the rectification circuit is configured to supply power to the plasma arc torch system.

7. The power supply assembly of claim 1, further comprising power management circuitry disposed in the input circuit to manage transfer of energy from the input circuit to the energy storage device via the charge signal.

8. The power assembly of claim 1, wherein the plasma arc torch is operated using power supplied, at least in part, from the energy storage device.

9. The power supply assembly of claim 1, wherein the plasma arc torch is operated using power supplied substantially from the input circuit.

10. A method for operating a power supply assembly for supplying power to a plasma arc torch system, the method comprising:
    directing an input signal to an input circuit to produce a first output signal, wherein the input circuit is configured to perform at least one of boosting a voltage of the input signal or rectifying a current of the input signal;
    receiving, by an energy storage device electrically connected to an output of the input circuit, a charge signal from the input circuit;
    generating, by the energy storage device, a second output signal configured to supplement the first output signal;
    comparing a parameter of the plasma arc torch system with at least one of the first or second output signal; and
    delivering directly, by a torch connector, the first output signal, the second output signal, or a combination of the first and second output signals to the plasma arc torch system based on the comparing to sustain a plasma arc.

11. The method of claim 10, further comprising sustaining the plasma arc by energy substantially from the second output signal of the energy storage device.

12. The method of claim 10, further comprising sustaining the plasma arc by energy from both the input circuit and the energy storage device.

13. The method of claim 10, further comprising sustaining the plasma arc by energy substantially from the first output signal of the input circuit.

14. The method of claim 10, further comprising:
    monitoring a parameter associated with the plasma arc torch system; and
    determining, based on the monitoring, an amount of power for delivery by the second output signal of the energy storage device to supplement the power of the first output signal.

15. The method of claim 14, further comprising increasing the amount of power delivered by the second output signal in response to a decrease or disappearance in the power of the first output signal.

16. The method of claim 10, further comprising modifying, by an inverter circuit, the at least one first or second output signal from a DC waveform to an AC waveform, wherein the inverter circuit is electrically connected to the energy storage device and the input circuit.

17. The method of claim 16, further comprising supplying, by the inverter circuit, the modified first or second output signal to the plasma arc torch system via the torch connector.

18. The method of claim 12, further comprising operating the plasma arc torch system to perform a cutting operation using the energy from both the input circuit and the energy storage device.

19. The method of claim 18, further comprising transitioning the cutting operation to substantially rely on the energy from the second output signal of the energy storage device.

20. The method of claim 18, further comprising transitioning the cutting operation to substantially rely on the energy from the first output signal of the input circuit.

21. The method of claim 10, further comprising modifying the at least one first or second output signal by an inverter circuit electrically connected to the energy storage device and the input circuit.

22. The method of claim 10, wherein the nominal voltage of the at least one the first output signal or the second output signal remains constant regardless of the voltage of the input signal.

* * * * *